United States Patent [19]

Ehle

[11] Patent Number: 4,573,824
[45] Date of Patent: Mar. 4, 1986

[54] APPARATUS FOR COUPLING A FIRST MEMBER TO A SECOND MEMBER

[75] Inventor: Ray G. Ehle, Redford, Mich.

[73] Assignee: GTE Products Corporation, Stamford, Conn.

[21] Appl. No.: 578,802

[22] Filed: Feb. 10, 1984

[51] Int. Cl.⁴ .............................................. F16B 21/00
[52] U.S. Cl. .................................... 403/322; 403/324; 279/67
[58] Field of Search ....................... 403/374, 322, 324; 279/97, 83, 67, 112

[56] References Cited

U.S. PATENT DOCUMENTS

| 2,485,799 | 10/1949 | Woytych | 279/67 UX |
| 3,498,653 | 3/1970 | McCreery | 403/322 |
| 3,923,414 | 12/1975 | Hopkins | 408/143 |

OTHER PUBLICATIONS

Komet-ABS published by Komet-R.B. Inc..

Primary Examiner—Andrew V. Kundrat
Attorney, Agent, or Firm—David J. Koris

[57] ABSTRACT

Apparatus for rigidly coupling a first member to a second member along a longitudinal axis is disclosed wherein one of the members carries a pair of wedges coupled to opposite threaded ends of a differential screw. The other one of the two members includes a reaction surface confronting wedging surfaces on each of the two wedges. Upon rotation of the differential screw, the wedges are moved in opposite directions to bear against the reaction surface with substantially a surface area contact to force the first and second member into rigidly coupled engagement. Upon rotation of the differential screw in an opposite direction, the wedges are positively moved in reverse opposite directions to effect uncoupling.

14 Claims, 6 Drawing Figures

APPARATUS FOR COUPLING A FIRST MEMBER TO A SECOND MEMBER

BACKGROUND OF THE INVENTION

1. Field of the Invention

The invention relates to apparatus for rigidly coupling two members along a longitudinal axis. More specifically, the invention pertains to apparatus for effecting relatively quick coupling connection and disconnection of first and second members where one of the members includes a male portion engaging an opening in the second member.

2. Description of the Prior Art

Quick connect/disconnect coupling arrangements are known wherein a cone-shaped member, e.g. a cone point screw, is carried by one of the members and engages a corresponding conical surface in the other member along a line contact to generate coupling forces parallel to a longitudinal axis common to the two members. One example of such known arrangements is found in U.S. Pat. No. 3,923,414 issued Dec. 2, 1975 to Hopkins and assigned to the same assignee as the instant invention. Another example of such a known arrangement is shown in a commercially available arrangement described in a brochure designated KOMET-A.B.S. 1/83/WA—10 published by Komet—R.B., Inc., Rolling Meadows, Ill.

Such known prior art arrangements do not offer maximum coupling strength, in that they rely on a line contact between the two members in generating the coupling force. Also, such arrangements have the disadvantage of not offering a positive disconnect or uncoupling action—i.e. the parts used to effect coupling may, especially with prolonged usage in attendant wear, stick or hangup when the coupling is attempted to be loosened.

SUMMARY OF THE INVENTION

Therefore, an object of the invention is to improve on the above described prior art arrangements by providing apparatus which will generate coupling forces between interacting surface areas rather than by line contact between coacting coupling portions associated with the first and second members.

In accordance with the invention, apparatus is provided for the relatively quick connection/disconnection of first and second members along a longitudinal axis and includes first and second wedges coupled to a differential acuator operative to move the wedges simultaneously in opposite directions, the wedges and coupled actuator all carried by one of the two members in floating fashion. The other one of the two members includes an associated reaction surface positioned such that, upon movement of the wedges in predetermined opposite directions by the differential actuator, wedging surfaces on each of the wedges coact with the reaction surface along surface area contacts to generate axial coupling forces between the two members. When the wedges are moved in the reverse opposite directions, the first and second members are positively released.

BRIEF DESCRIPTION OF THE DRAWING

The objects and features of the invention will become apparent from a reading of a detailed description, taken in conjunction with the drawing in which.

DETAILED DESCRIPTION

Figure 1:
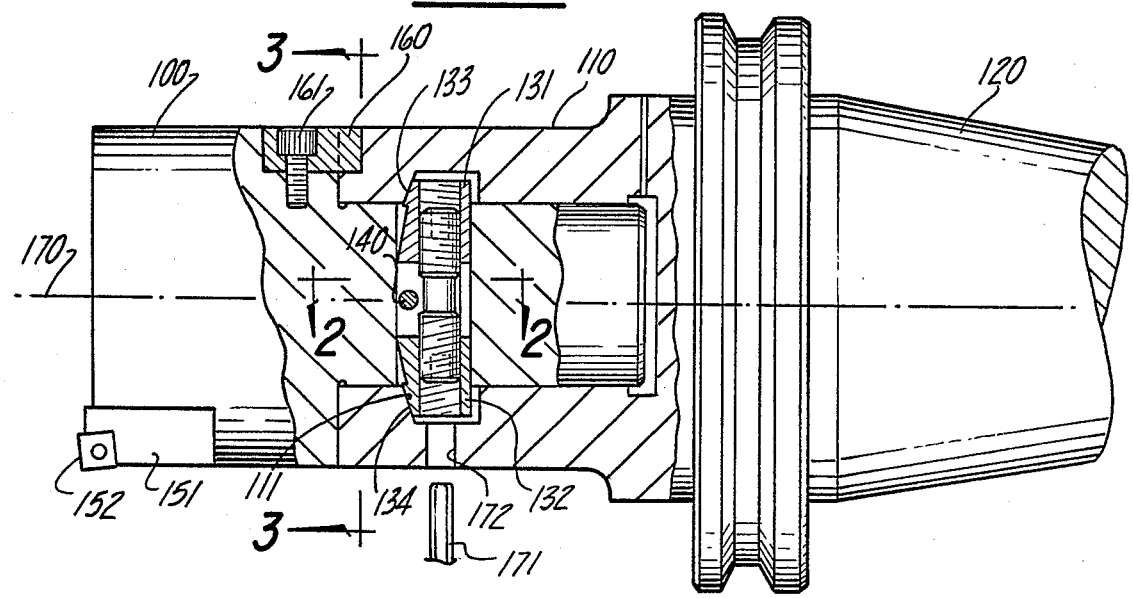
FIG. 1 is a partial cross sectional view taken normal to a longitudinal axis of the members to be coupled.
Figure 2:
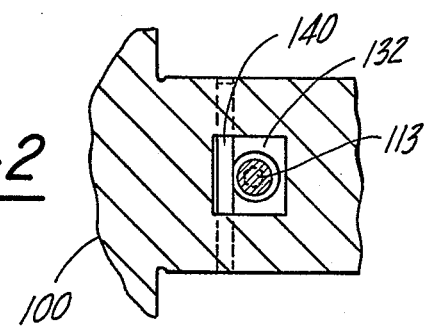
FIG. 2 is a cross section view taken along arrows 2—2 of FIG. 1.
Figure 3:
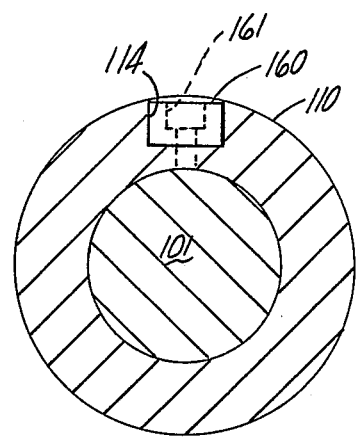
FIG. 3 is an axial view taken along arrows 3—3 of FIG. 1.
Figure 4:
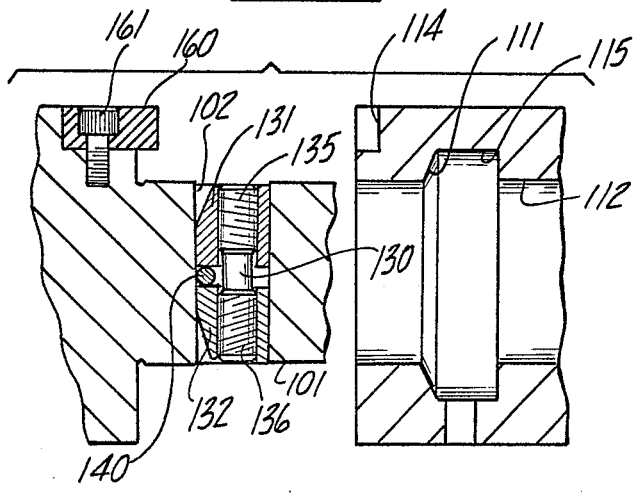
FIG. 4 is a view similar to FIG. 1 but with the first and second members disengaged.

It is to be noted that in the various views of the drawing the same components or portions of the apparatus disclosed are designated by identical reference numerals in each of the figures.

With reference to FIGS. 1-4, male member 100 comprises in this exemplary embodiment a boring bar nose carrying cutting cartridge 151 which in turn carries a cutting element or insert 152. Male member 100 includes a pilot portion 101 of smaller cross sectional area or diameter than that of the main shank of the boring nose.

Female member 110, for example an extension adaptor suitable for mounting to the spindle of the machine tool, includes a pilot receiving bore or cavity 112 shaped for mating receipt of pilot portion 101 of male member 100. Rearward of the pilot receiving bore 112, member 110 includes an adaptor with an industry standard taper shank 120 for suitable mounting to the spindle of the machine tool.

To assure the proper angular position of the cutting element 152 when members 100 and 110 are in the coupled condition, an alignment key 160 is bolted to the peripheral surface of the shank of male member 100 via key mounting bolt 161. A mating keyway 114 is formed in the peripheral surface of the shank of female member 110 for receipt of alignment key 160. Key 160 additionally provides the function of a back-up drive element between member 100 and 110.

Pilot portion 101 of male member 100 includes a wedge housing slot 102 extending through pilot portion 101 substantially normal to the common longitudinal axis 170 of the coupled members 100 and 110. Slideably received in slot 102 are a first wedge 131 and a second wedge 132 each threadingly coupled to an actuator element comprising in this embodiment differential screw 130. Differential screw 130 has a first threaded portion 135 threaded in a first sense and a second portion 136 threaded in an opposite sense respectively threadingly coupled to appropriately threaded bores in wedges 131 and 132. Retention pin 140 is housed in a bore passing through pilot portion 101 transverse to axis 170 and intersecting wedge housing slot 102 in a manner such that wedges 131 and 132 and screw 130, when threadingly coupled, are slideably retained in housing slot 102 even when male member 100 is completely disconnected from female member 110.

Formed about the periphery of pilot receiving bore 112 of female member 110 is an annular wedge receiving cavity 115 extending about longitudinal axis 170. Cavity 115 includes an annular sloping reaction surface 111 which, when pilot portion 101 of male member 100 is inserted into cavity 112, will confront mating wedging surface 133 of wedge 131 and wedging surface 134 of wedge 132. In the embodiment of FIGS. 1-4 surfaces 111, 133 and 134 are conical. However, any type surface, e.g. planar, may be employed in accordance with the invention.

An access bore or port 172 extends radially from the outer surface of the shank of female member 110 inwardly to intersect wedge receiving cavity 115 of the pilot receiving bore 112 to provide access to an end of differential screw 130 by a suitable driving element 171. Preferably a second access port (not shown) is provided diametrically opposite port 172 such that either end of differential screw 130 may be accessed by a driving element. One such suitable driving element is an hexagonal wrench for insertion in an appropriately shaped hexagonal cavity 113 in either end of actuator screw 130.

An alternative to annular wedge receiving cavity 115 and associated annular reaction surface 111 would be to provide separate distinct slots or windows for receipt of wedges of 131 and 132. Such slots would be appropriately positioned for receipt of the two wedging elements and each would include its own reaction surface for interacting with wedging surfaces 133 and 134 of wedges 131 and 132, respectively. Such an alternative approach would be particularly suited to applications involving very large diameter members 100 and 110 and would offer the advantage that less material would have to be removed from the body of female member 110's shank. Additionally, it may be found more economical to mill out planar reaction surfaces for engagement by corresponding planar wedging surfaces on the wedges in this alternative approach.

With the apparatus as above described, members 100 and 110 are coupled and uncoupled as follows. Pilot portion 101 of male member 100 is inserted into pilot receiving cavity 112 of member 110 in an appropriate radial position as determined by the mating engagement between key 160 and keyway 114. A driving element 171 such as an hexagonal wrench is then inserted through access port 172 to engage one end of differential screw 130. Turning driving element 171 will, in turn, cause differential screw 130 to rotate thereby moving in simultaneous fashion wedges 131 and 132 radially outwardly from longitudinal axis 170, in turn, causing wedging surfaces 133 and 134 to bear against reaction surface 111 of female member 110. Such interaction between surfaces 133, 134 and surface 111 generate axial forces parallel to axis 170 thereby drawing male member 100 and female member 110 into a rigidly coupled configuration. Since the wedges/screw assembly floats in the wedge housing slot 102 in pilot portion 101, wedges 131 and 132 tend to be self-centering while coupling is being effected and provide equal coupling force on both sides of axis 170. Such equal distribution of force leads to a stable connection between members 100 and 110. Rotation of driving element 170 in an opposite direction will cause differential screw 130 to positively retract wedges 131 and 132 radially inwardly towards axis 170 thereby releasing the connection.

Figure 5:
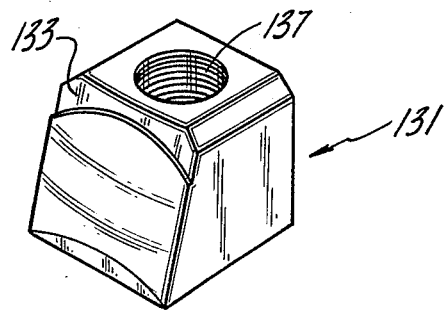
FIG. 5 is a perspective view of a wedge designed for use in accordance with the principles of the invention.

With reference to FIG. 5, a perspective view of a wedge 131 suitable for use in accordance with the principles of the invention is set forth. Wedge 131 includes threaded hole 137 for receipt of actuator screw 130. Wedging surface 133 is ground to substantially achieve surface contact with reaction surface 111 of FIGS. 1-4. By appropriately shaping surface 133 in accordance with the principles of the invention, surface contact rather than line contact is established between the wedging elements and the reaction surface of the receiving member.

Figure 6:
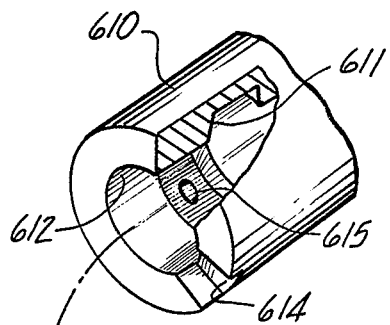
FIG. 6 is an exploded perspective view of an alternative embodiment.
Figure 6:
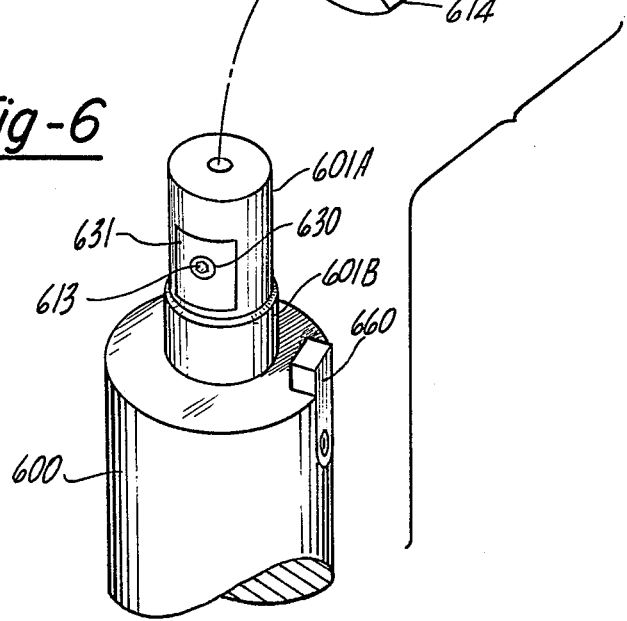

With reference to FIG. 6, an alternative embodiment is set forth wherein the pilot extension 601 of male member 600 comprises a relieved portion 601a of smaller cross sectional diameter joined to a larger pilot portion 601b. Relieved portion 601a includes an appropriate wedge receiving slot for carrying the wedges, one of which, 631, is shown, along with actuator screw 630 having hex cavity 613 formed in the end thereof. Male member 600 includes a locator key 660 which is received in mating keyway 614 of female member 610. Pilot portions 601a and 601b are received in a pilot receiving bore 612 of female member 610. Surrounding pilot receiving bore 612 is reaction surface 611. Access port 615 is provided through the shank of female member 614 for appropriate access by a driving element to the end of actuator screw 630 at its hex cavity 613. With this arrangement of the pilot portion, relieved portion 601a allows for easier sliding fit between male member 600 and female member 610 prior to the initiation of lockup.

Prototype coupling arrangements built in accordance with the disclosed invention have demonstrated excellent results. For example, male and female members, each two feet in length, were coupled axially together using the above arrangement and demonstrated a very reliable and repeatable rigid connection with minimal runout on the order of three ten thousandths of an inch. One surprising experimental result was evidenced by the fact that a solid four foot section of bar was measured to have a sag of four thousandths of an inch compared to two twofeet coupled sections demonstrating only on the order of one and one-half thousandths of an inch sag between centers. Experimental boring applications under relatively heavy cutting conditions have demonstrated that the rigidity of the coupling attained with apparatus designed in accordance with the disclosed invention has been highly satisfactory.

It should be noted that the invention described herein has been illustrated with reference to particular embodiments. It is to be understood that many details used to facilitate the desriptions of such a particular embodiment are chosen for convenience only and without limitation on the scope of the invention. Many other embodiments may be devised by those skilled in the art without departing from the scope and spirit of the invention. For example, the wedge/screw assembly could be carried by the female member, while the reaction surfaces could be formed on the male member. One such approach would provide a two-pronged pilot extension, each prong surround the differential screw extending across the cavity in the female member and each prong carrying appropriate reaction surfaces. In this alternative approach, the wedges would be driven radially inwardly toward the axis to lock the male and female members together and would be driven radially outwardly of the axis to positively unlock the connection.

Accordingly, the invention is intended to be limited only by the scope and spirit of the appended claims.

I claim:

1. Apparatus for coupling a male member to a female member along a common longitudinal axis, the male and female members each having shank portions, with the male member having an axially extending pilot portion of cross-sectional area less than that of the male member shank portion and a first section adjoining the shank portion and a smaller second end section, the pilot portion shaped for mating engagement with a cavity in the shank portion of the female member, the apparatus comprising:

first and second wedge means each having a wedging surface, the first and second wedge means carried by the male member on the second section of the pilot;

wedge actuator means coupled to the first and second wedge means, operative to simultaneously move the first and second wedge means in opposite directions traverse to the longitudinal axis; and conical reaction surface means on the female member confronting complementary convex conical wedging surfaces of the first and second wedge means in a manner such that as the wedge actuator means moves the first and second wedge means in predetermined opposite directions, the wedging surfaces engage the reaction surface means with substantial surface contact so as to provide a force urging the first and second members together along the axis in substantially rigid fashion.

2. Apparatus as set forth in claim 1 wherein the wedge actuator means comprises a differentially threaded screw and wherein the first wedge means is threadingly coupled to a first threaded end of the screw, and the second wedge means is threadingly coupled to a second oppositely threaded end of the screw in a manner such that, upon rotation of the screw in a first rotational direction, the first and second wedge means simultaneously move radially outwardly from the axis and, upon rotation of the screw in a second rotational direction, the first and second wedge means simultaneously move radially inwardly toward the axis.

3. Apparatus as set forth in claim 1 wherein the reaction surface means comprises an annular surface formed in the female member extending in a continuous manner about the axis.

4. Apparatus as set forth in claim 1 wherein the reaction surface means comprises first and second distinct surfaces formed in the female member on opposite sides of the axis respectively positioned to engage with the wedging surfaces of the first and second wedge means.

5. Apparatus for coupling a male member to a female member along a common longitudinal axis, the male and female members each having shank portions, with the male member having an axially extending pilot portion of cross sectional area less than that of the male member shank portion and a first section adjoining the shank portion and a smaller second end sections, the pilot portion shaped for mating engagement with a cavity in the shank portion of the female member, the apparatus comprising:

a first wedge having a first threaded bore therethrough and a first wedging surface, and a second wedge having a second threaded bore therethrough and a second wedging surface, the first and second wedges carried by the male member on the second section of the pilot portion;

a differential screw threadingly engaging the first bore in a first sense and the second bore in a second sense opposite to the first sense, operative upon rotation to simultaneously move the first and second wedges in opposite directions traverse to the longitudinal axis; and conical reaction surface means on the female shank portion confronting complimentary convex conical surfaces of the first and second wedging surfaces in a manner such that as the screw is rotated in a first direction the first and second wedges move in opposite directions transverse to the axis to engage the reaction surface means with substantially a surface area contact so as to force the male and female members into substantially rigid axial engagement.

6. The apparatus of claim 5 further comprising a key extending axially from one end of a peripheral surface of the male shank portion and toward the female member, and a keyway in the female shank portion shaped for mating receipt of the key.

7. The apparatus of claim 5 further comprising means for retaining the first and second wedges, when both are coupled to the differential screw in the pilot portion.

8. The apparatus of claim 7 wherein the first and second wedges, while coupled to the differential screw, are retained in the second pilot portion of the male member, the reaction surface means located in the female member shank portion, and the first and second wedges are moved outwardly from the axis to effect coupling and inwardly toward the axis to release coupling between the male and female members.

9. The apparatus of claim 8 wherein the female shank portion includes at least one access bore extending from a peripheral surface of the female shank portion to the cavity therein, the access bore positioned such that a driving element may be inserted therethrough into engagement with the differential screw to effect rotation thereof.

10. The apparatus of claim 8 further comprising a wedge receiving slot extending through the pilot portion substantially normal to the longitudinal axis and shaped for sliding receipt of the first and second wedges while the wedges are threadingly coupled to opposite ends of the differential screw.

11. The apparatus of claim 10 wherein the means for retaining comprises a pin housed in a mating cavity in the pilot portion passing through the pilot portion transverse to the axis and intersecting the wedge receiving slot in a manner such that the pin is engageable by portions of the first and second wedges facing the axis.

12. The apparatus of claim 10 wherein the portion further comprises a first section adjoining the shank portion of the male member and a second portion adjoining the first portion the second portion including wedge receiving slot has a cross sectional area less than the first section.

13. The apparatus of claim 8 wherein the reaction surface means comprises an annular groove extending from the cavity in the female shank portion, the annular groove including a sloping surface extending away from the cavity opening at an acute angle to the axis, all portions of the sloping surface shaped for mating wedging engagement with the first and second wedging surfaces.

14. The apparatus of claim 8 wherein the reaction surface means comprises first and second distinct slots extending from the cavity in the shank of the female member, the first and second slots positioned on opposite sides of the axis and each slot including a sloping surface extending away from the cavity opening at an acute angle to the axis and shaped for respective mating wedging engagement with the first and second wedging surfaces.

* * * * *